T. C. ADAMS.
FEED BAG.
APPLICATION FILED SEPT. 27, 1909.
967,874.
Patented Aug. 23, 1910.
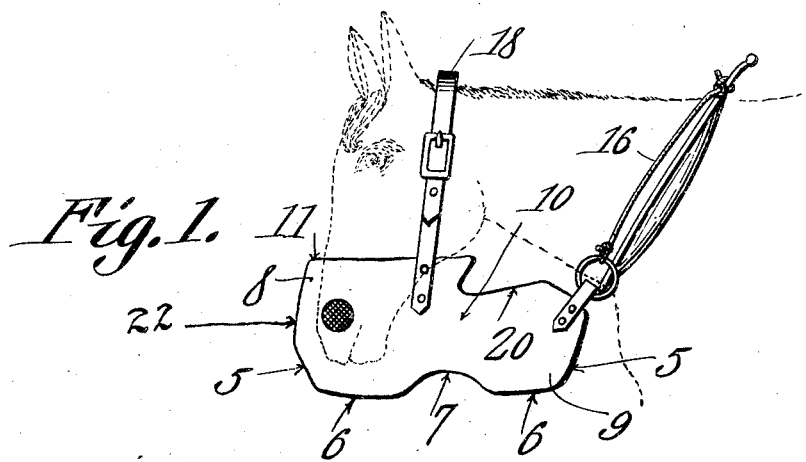
Fig. 1.
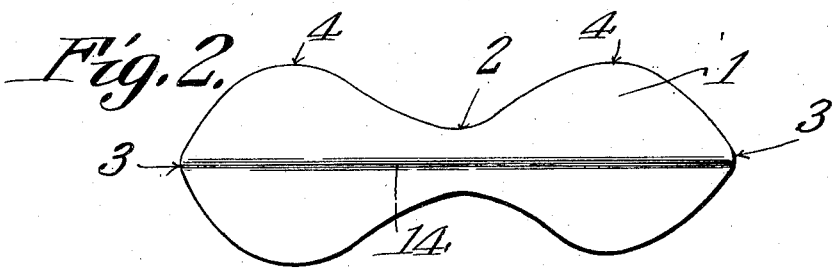
Fig. 2.
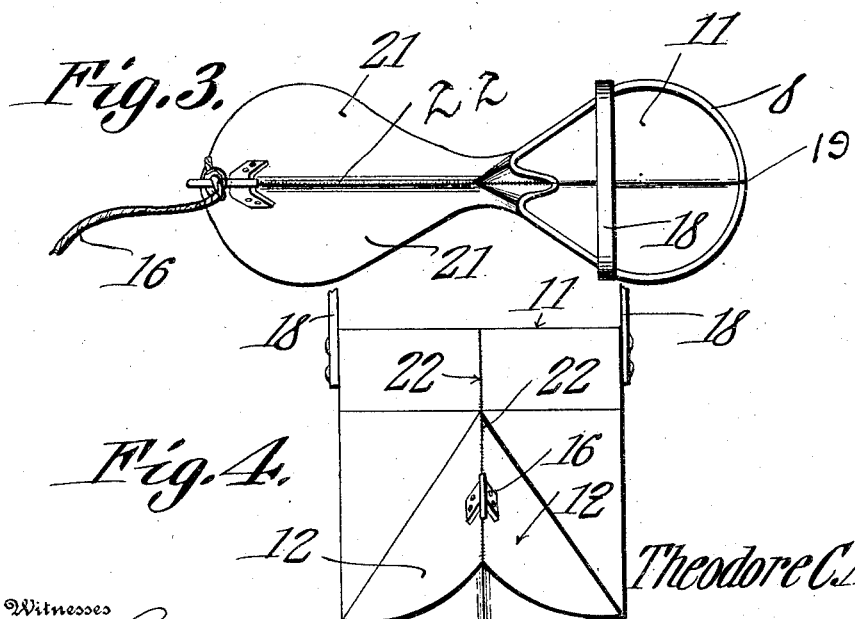
Fig. 3.
Fig. 4.
Witnesses
Inventor
Theodore C. Adams.
By C. A. Snow & Co.
Attorneys
Mason B. Lawton
THE NORRIS PETERS CO., WASHINGTON, D. C.

ically pointed out in that portion of this instrument wherein patentable novelty is claimed for certain distinctive features of the device, it being understood that, within the scope of what hereinafter thus is claimed, divers changes in the form, proportions, size and minor details of the structure may be made without departing from the spirit or sacrificing any of the advantages of the invention.
UNITED STATES PATENT OFFICE.

THEODORE C. ADAMS, OF PORTLAND, OREGON.

FEED-BAG.

967,874. Specification of Letters Patent. Patented Aug. 23, 1910.

Application filed September 27, 1909. Serial No. 519,891.

*To all whom it may concern:*

Be it known that I, THEODORE C. ADAMS, a citizen of the United States, residing at Portland, in the county of Multnomah and State of Oregon, have invented a new and useful Feed-Bag, of which the following is a specification.

The objects of the invention are, generally, the provision in a merchantable form, of a device of the above mentioned class which shall be inexpensive to manufacture, facile in operation, and devoid of complicated parts; specifically, the provision of a feed bag so constructed that when the animal holds its head in a normal and usual position, grain, which is stored at one end of the device, shall be there housed, out of the reach of the animal, the device, when the animal tilts its head slightly, being operated to dispose a limited quantity of the grain within the reach of the animal, the grain being thus fed to the animal in limited quantities, such feeding taking place only when the head of the animal is moved from a normal to an abnormal depending position; the provision of a device of the class described in which that portion thereof which incloses the nose of the animal shall be so disposed that it is impossible for the grain inclosed in the storage portion to leak from the nose-inclosing portion; the provision of a device of the class above mentioned provided with a storage compartment of novel and improved construction whereby the grain contained therein may be prevented from bulging beyond the contour of the device; the feed bag as an entity being so constructed that it may be folded readily into compact form; other and further objects being made manifest as the description of the invention progresses.

The invention consists in the novel construction and arrangement of parts hereinafter described, delineated in the accompanying drawings and particularly pointed out in that portion of this instrument wherein patentable novelty is claimed for certain distinctive features of the device, it being understood that, within the scope of what hereinafter thus is claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings, Figure 1 is a side elevation; Fig. 2 is a bottom plan; Fig. 3 is a top plan; and Fig. 4 an end elevation.

The invention includes a bottom 1, fashioned from relatively stiff, yet pliable material, such as leather, or a plurality of thicknesses of canvas. The bottom 1 is diminished in breadth in its intermediate portion as denoted by the numeral 2 and is pointed at its ends, as denoted by the numeral 3, the parts which are disposed between the ends 3 and the intermediate portion 2 being broadened, as denoted by the numeral 4, the edges of the bottom being defined by easy curves uniting the points 3.

The foregoing description is most clearly seen upon an examination of the bottom plan of the device, but when the same is viewed in side elevation, it will be seen that the pointed ends 3 are upturned, as denoted by the numeral 5, the portions 4 being depressed, as denoted by the numeral 6 to form grain-receiving pockets and the intermediate, diminished portion 2 of the bottom being curved upwardly, as denoted by the numeral 7, to define, within the device, a transversely disposed rib, separating from each other the pockets formed by the depressions 6.

The body portion of the said bag comprises a tubular feed compartment 8 and a closed storage compartment 9, united, above the upwardly curved portion 2 of the bottom, by a diminished passage 10, formed by the curvature denoted by the numeral 7, and by the inclination 20 given to the upper edge of the compartment 9 adjacent the feeding compartment 8. The side walls of the compartment 8 are carried upwardly so that the open end 11 of the feeding compartment is disposed above the closed storage compartment 9. By this construction, none of the grain in the compartment 9 can flow by gravity out of the device, it being intended, as hereinafter more fully pointed out, that when the head of the animal is in a normal position, the longer axis of the device shall be horizontally disposed.

When the device is viewed in end elevation, it will be seen that the side walls 12 of the compartment 9 are united along their upper edges, to give to the storage compartment 9 a triangular outline in cross section.

By this construction, the grain in the storage compartment 9 is prevented from bulging the walls 12 outwardly beyond the contour of the bottom 1, a contingency which would tend to prevent a proper flow of the grain from the storage compartment 9 to the feeding compartment 8, it being understood that the body portion of the device is fashioned from material which is somewhat more flexible than that of which the bottom 1 is composed.

The bottom 1 is adapted to be folded along a longitudinal line 14 and, owing to the peculiar shape of the bottom 1, the same may readily be housed within the contour of the device. By causing the extremities of the bottom to be upwardly curved, as denoted by the numeral 5, the feed in the storage compartment 9 will tend to gravitate toward the upwardly curved portion 7, thereby facilitating the flow of the grain toward the feeding compartment, while the grain which is disposed in the feeding compartment will tend to gravitate away from the end of the device to assume a position within easy reach of the animal.

The body of the device is fashioned from two members 21, the lower edges of which are assembled with the periphery of the bottom 1, the ends of the members 21 being united by seams 19 and 22, the seam 19 extending from the apex 3 of the bottom to the periphery of the feeding compartment 8, and the seam 22 extending from the opposite apex of the bottom, along the top of the storage compartment 9, and terminating at the top of the feeding compartment 8. Rising from the side walls of the feeding compartment 8, are flexible members 18 adapted to be united above the head of the animal. A flexible suspension member 16 is assembled with the end of the storage compartment 9, this element being adapted to be connected with the hames or with any other accessible part of the harness so that, when the head of the animal is disposed in its normal position, the longer axis of the device will be horizontally disposed. When thus mounted, it will be seen that it is impossible for the grain in the compartment 9 to leak from the device and, as the animal inclines its head, a limited quantity of the grain in the storage compartment 9 will pass over the upbent portion 7 of the bottom and flow into the feeding compartment 8. When the animal has eaten a sufficient quantity, the head of the animal being elevated, the grain in the storage compartment 9 will cease to flow into the feeding compartment 8. There will, therefore, when the animal has ceased feeding, be no grain in the compartment 8 to nauseate the animal, or to become moist and caked upon the interior of the feed bag.

It is obvious that the position of the feed bag with respect to the horizontal, may be adjusted to suit the user by varying the length of the member 16, so that, if desired, the bag shall incline slightly toward its outer end.

It is obvious that the means whereby the feed bag is suspended, may be varied to suit the exigencies of the particular case. To this end, for instance, the member 18 may consist of two ropes, the ends of which are tied together. Likewise, the member 16 may be duplicated for attachment with both of the hames of the harness, and the members 16 may be provided terminally with snaps, adapted to be engaged by the hame rings, or with rings, which may be slipped over the ends of the hames. These points are mere structural changes, which will suggest themselves to any skilled mechanic, and although I consider it wise to mention that these changes may be made, I do not consider necessary a specific delineation of them.

Having thus described my invention, what I claim as new and desire to secure by Letters-Patent is:—

In a feed bag, a one piece bottom extended from one end of the bag to the other, the bottom being diminished in width intermediate its ends, and arched upwardly in its diminished portion, the bottom being provided with pointed, upturned ends; and a body assembled with the bottom and comprising a closed storage compartment and a tubular feeding compartment, between which compartments the arched portion of the bottom serves to define a diminished passage; the bottom being foldable along its longitudinal center to collapse the bag transversely, and the storage compartment being triangular in cross section to facilitate the collapsing of the bag when the bottom is folded.

In testimony that I claim the foregoing as my own, I have hereto affixed my signature in the presence of two witnesses.

THEODORE C. ADAMS.

Witnesses:
EDWARD ADAMS,
JOHN KANNOLT.